United States Patent Office 3,205,259
Patented Sept. 7, 1965

3,205,259
PRODUCTION OF ESTERS FROM AN
OLEFINIC COMPOUND
Hermann Zorn, Gontardstrasse 2, Mannheim, Germany,
and Gerhard Reinhold Frank, Julius Beckerstrasse B3,
St. Ilgen, Germany
No Drawing. Filed Oct. 23, 1961, Ser. No. 148,015
Claims priority, application Germany, Dec. 23, 1960,
T 19,458; Mar. 23, 1961, T 19,846, T 19,848
3 Claims. (Cl. 260—488)

The present invention relates to high molecular esters and to processes of producing the same.

High molecular esters of various types are known to be useful as lubricants. For example, glycols having a straight or a branched chain of carbon atoms in their molecule have been esterified with monocarboxylic acids of medium molecular weight such as sebacic acid.

It has been found that high molecular esters derived from polyhydric alcohols having at least 12 carbon atoms and esterified with carboxylic acids in such manner that the resulting esters contains at least 21 carbon atoms are distinguished by outstanding lubricant properties. They have good lubricity at high and low temperatures due to their substantially constant viscosity. Esters of the invention can be produced according to various methods. Polyhydric alcohols, especially glycols, having at least 12 carbon atoms may be esterified in the presence of suitable esterifying catalysts with organic monocarboxylic acids, preferably open-chained fatty acids of such chain-length that the resulting esters contain at least 21 carbon atoms. Particularly valuable esters are those of higher molecular branched monocarboxylic acids. Ethylhexanoic acid may be mentioned by way of example, but the invention comprises generally esters of the type defined hereinbefore and is in no way limited to those derived from ethylhexanoic acid as will become apparent from the examples.

For the production of the said new esters, glycols may be prepared by reacting carbon monoxide and hydrogen with unsaturated fatty acids such as oleic acid in the presence of cobalt or iron compounds as catalysts. The esters may be purified according to usual methods such as recrystallization or redistillation or by way of addition compounds with urea and the like.

Esters of particularly good stability against heat and cold can be prepared from the products of said reaction of unsaturated fatty acids with hydrogen and carbon monoxide if the crude reaction mixture is purified by treatment with urea. For example, a mixture of divalent alcohols having an average of 19 carbon atoms is obtained by subjecting oleic acid to the action of carbon monoxide and hydrogen in the presence of a cobalt catalyst. The crude reaction product is mixed with finely powdered urea at normal or slightly elevated temperature. A solid precipitate is removed from the mixture by filtration, pressing or on a centrifuge. The treatment with urea may be repeated once or several times, the product being further improved by each treatment.

Another method of purifying the polyvalent alcohols consists in treating the crude reaction mixture containing the high molecular glycol with low boiling organic solvents at temperatures below room temperature, and removing any solid ingredients separated thereby. Suitable low boiling solvents include aliphatic alcohols such as methanol or ethanol, diethylether, acetone, methylethylketone, diethylketone, and halogenated hydrocarbons such as dichloromethane or dichloroethane.

Still a further method for the production of the purified glycols consists in the following procedure.

The crude reaction product of an unsaturated fatty acid with carbon monoxide and hydrogen in the presence of a catalyst is esterified with a low molecular fatty acid such as formic acid or acetic acid. The esterified product is treated with urea. The solids formed on cooling are recovered, and the urea is split from the solid addition compounds obtained by means of mineral acids such as hydrochloric acid. The esters of the low molecular acid are saponified and the resulting, very pure polyhydric alcohol is esterified with a higher molecular, preferably branch-chained monocarboxylic acid to form ester of the desired molecular size.

The esters according to the present invention are distinguished by excellent lubricating properties over a surprisingly wide range of temperatures. They do not become solid or semisolid even at −60° C. and below. On the other hand, they do not decompose even when heated in the absence of oxygen, for 24 hours at 360° C. This is particularly true with esters obtained according to the special processes set forth in the preceding paragraphs. Whereas the new esters are primarily lubricating oils of high stability they may also be employed as plasticizers, for improving natural or synthetic rubber, or as fitting material.

The invention is further illustrated by the following examples but is not limited thereto. The parts are by weight if not stated otherwise.

*Example 1*

A mixture of 200 parts of nonadecane diol and 200 parts of 2-ethylcaproic acid is molten at about 50° C. and slowly heated to about 200° C. with stirring while dry hydrogen chloride gas is passed through the molten mixture. After four hours the excess acid is distilled off. The ester formed in a yield of 88 percent boils between 245 and 255° C. at a pressure of 0.1 millimeter mercury. It is a clear odourless liquid which may serve as high duty lubricant. It is also useful as a plasticizer.

*Example 2*

100 parts of a technical product consisting mainly of diols of an average of 19 carbon atoms, and obtained by reacting oleic acid with carbon monoxide and hydrogen in the presence of a cobalt catalyst are dissolved in 1000 parts by volume of methanol. The solution is mixed with 300 parts of finely divided dry urea and cooled to 5° below zero C. The solid substance separating is filtered off, and the filtrate is again mixed with 100 parts of urea while cooling. This treamtent is repeated onec more, and then the methanol is distilled off from the filtrate. The diol mixture thus obtained is freed from urea by washing with 1 percent hydrochloric acid and then esterified with 2-ethylcaproic acid. The ester thus obtained remains liquid to 69° below zero C. It has excellent heat resistance and very good lubricating properties.

*Example 3*

500 parts of the starting material employed in Example 2 are dissolved in 2000 parts by volume of methanol. 750 parts of finely divided urea are added while stirring and slowly warming. The clear solution obtained is cooled to room temperature and separated from a precipitated solid by filtration. The filtrate is freed from methanol by distillation. During this step, the rest of the desired solid product is precipitated. It is united with the main part and washed with dilute hydrochloric acid in the presence of benzene. The addition compound is thereby decomposed, the urea dissolving in the aqueous phase and the purified diol mixture in the benzene phase. The benzene solution is dried by means of anhydrous Glauber's salt and the benzene is distilled off. The diol residue is esterified with lauric acid giving an ester mixture which remains liquid to 62° C. below zero.

When the diol mixture is esterified with 9,10-dimethyl stearic acid, the resulting ester mixture remains liquid to 61° C. below zero.

But reaction products have excellent thermal stability. After heating for six hours to 370° C. in the absence of oxygen (air), no substantial decrease of viscosity is observed.

*Example 4*

500 parts of the diol mixture employed as starting material in the preceding example are dissolved in 1500 parts of methanol. By cooling the solution to −5° C. solids are formed, and are removed by filtration. The filtrate is then freed of methanol by distillation and the diol mixture is esterified with the calculated amount of 2-ethyl caproic acid. The resulting ester mixture remains liquid to −62° C. Heating to 360° C. for several hours in the absence of air causes practically no change in its viscosity, color and other properties.

*Example 5*

A mixture of crude diols having an average of 19 carbon atoms and obtained by reacting carbon monoxide and hydrogen with oleic acid in the presence of a cobalt catalyst is heated with an equal amount of formic acid for several hours while stirring and passing hydrogen chloride gas. The excess of formic acid is distilled off and the mixture of formic acid esters is purified by distillation under reduced pressure.

100 parts of the mixture of formic acid esters thus obtained are mixed with a solution of 100 parts of urea in 100 parts of methanol at about 40° C. The mixed solution is cooled to −5° C. and freed from solid constitutents precipitated thereby. This treatment is repeated twice. The solid substances formed are believed to consists of addition products of the formic acid esters of the diol mixture with urea. The several solid precipitates are combined and decomposed by means of dilute hydrochloric acid. The liquid ester mixture thus obtained is saponified by means of one tenth normal sodium hydroxide solution, and the free diol mixture is esterified with 2-ethyl caproic acid. The mixed ester does not solidify to −69° C.

What we claim is:
1. A process of producing an ester of high molecular weight which comprises:
    (a) reacting oleic acid with carbon monoxide and hydrogen in the presence of a catalyst to produce a reaction mixture containing diols having an average of 19 carbon atoms per molecule;
    (b) reacting said reaction mixture with a low-molecular fatty acid to esterify said diols, whereby an ester mixture is formed in said reaction mixture;
    (c) reacting said ester mixture in the remainder of said reaction mixture with urea to form a reaction product consisting essentially of said ester mixture and of said urea;
    (d) separating said reaction product from the remainder of said reaction mixture;
    (e) splitting the separated reaction product into urea and a purified ester mixture;
    (f) saponifying said purified ester mixture to form purified diols;
    (g) esterifying said purified diols with an alkanoic acid having between 8 and 20 carbon atoms per molecule.
2. A process as set forth in claim 1, wherein said alkanoic acid is 2-ethyl caproic acid.
3. A process of producing an ester of high molecular weight which comprises:
    (a) reacting a reaction mixture obtained by the interaction of oleic acid with carbon monoxide and hydrogen in the presence of a catalyst, said mixture containing a plurality of diols having an average of 19 carbon atoms per molecule, with a low molecular fatty acid to esterify said diols, whereby an ester mixture is formed;
    (b) reacting said ester mixture with urea to form a reaction product consisting essentially of said ester mixture and of said urea;
    (c) splitting said reaction product into urea and a purified ester mixture;
    (d) saponifying said purified ester mixture to form purified diols; and
    (e) esterifying said purified diols with an alkanoic acid having between 8 and 20 carbon atoms per molecule.

References Cited by the Examiner

UNITED STATES PATENTS

| | | | |
|---|---|---|---|
| 2,566,268 | 8/51 | Wayne | 260—410.6 |
| 2,820,014 | 1/58 | Hartley et al. | 260—410.6 |

FOREIGN PATENTS 718,225  11/54  Great Britain.

LORRAINE A. WEINBERGER, *Primary Examiner.*

LEON D. ROSDOL, CARL D. QUARFORTH,
*Examiners.*